June 10, 1947. W. GILBERT, SR 2,422,007
ROTARY SEAL MEMBER
Filed Sept. 4, 1943 3 Sheets-Sheet 1
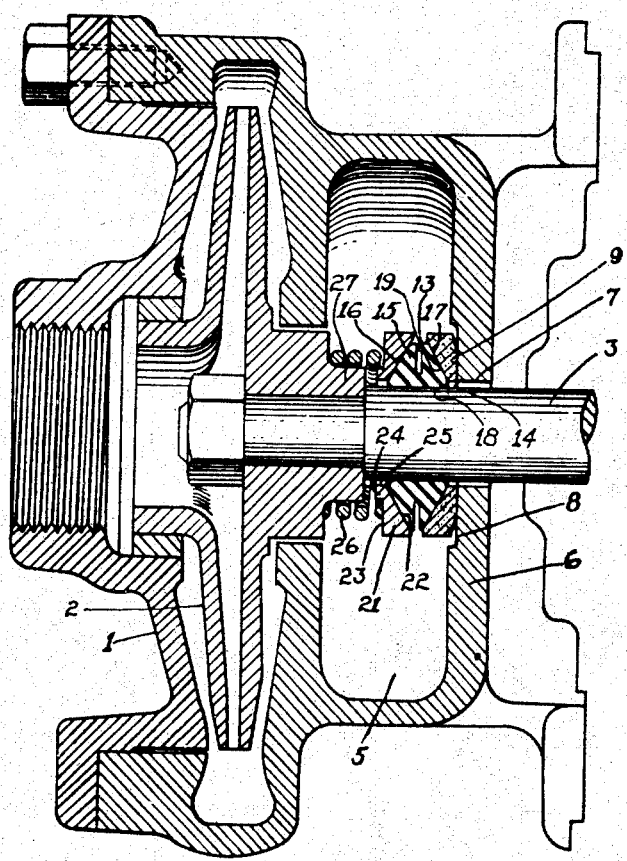
Fig.1.
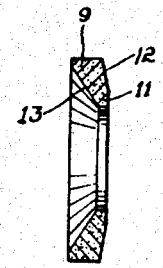
Fig.2.
Fig.2a.
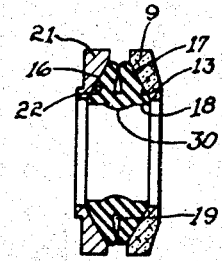
Fig.3.
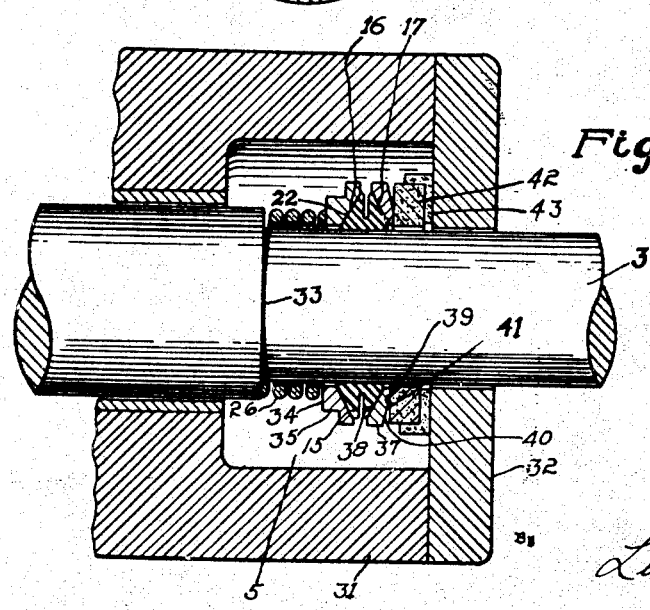
Inventor
WALTER GILBERT SR.
Lewis D. Konigsford
Attorney June 10, 1947.  W. GILBERT, SR  2,422,007
ROTARY SEAL MEMBER
Filed Sept. 4, 1943  3 Sheets-Sheet 2
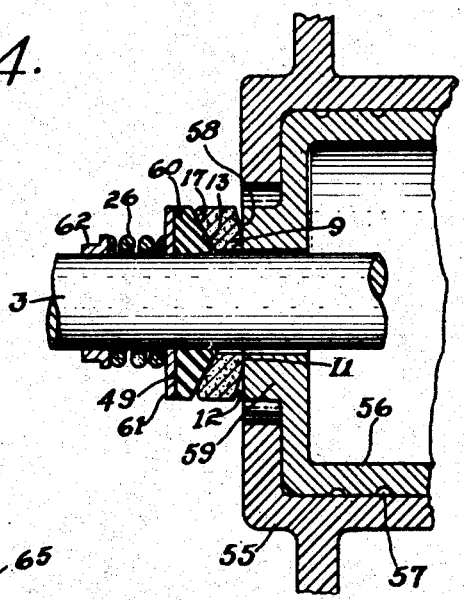
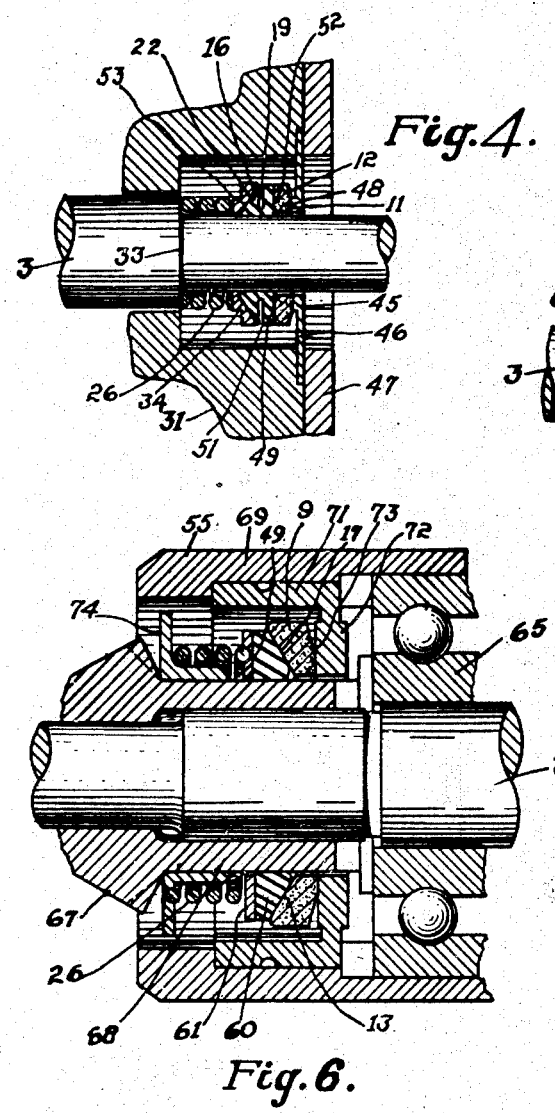
Inventor
WALTER GILBERT SR.
Attorney

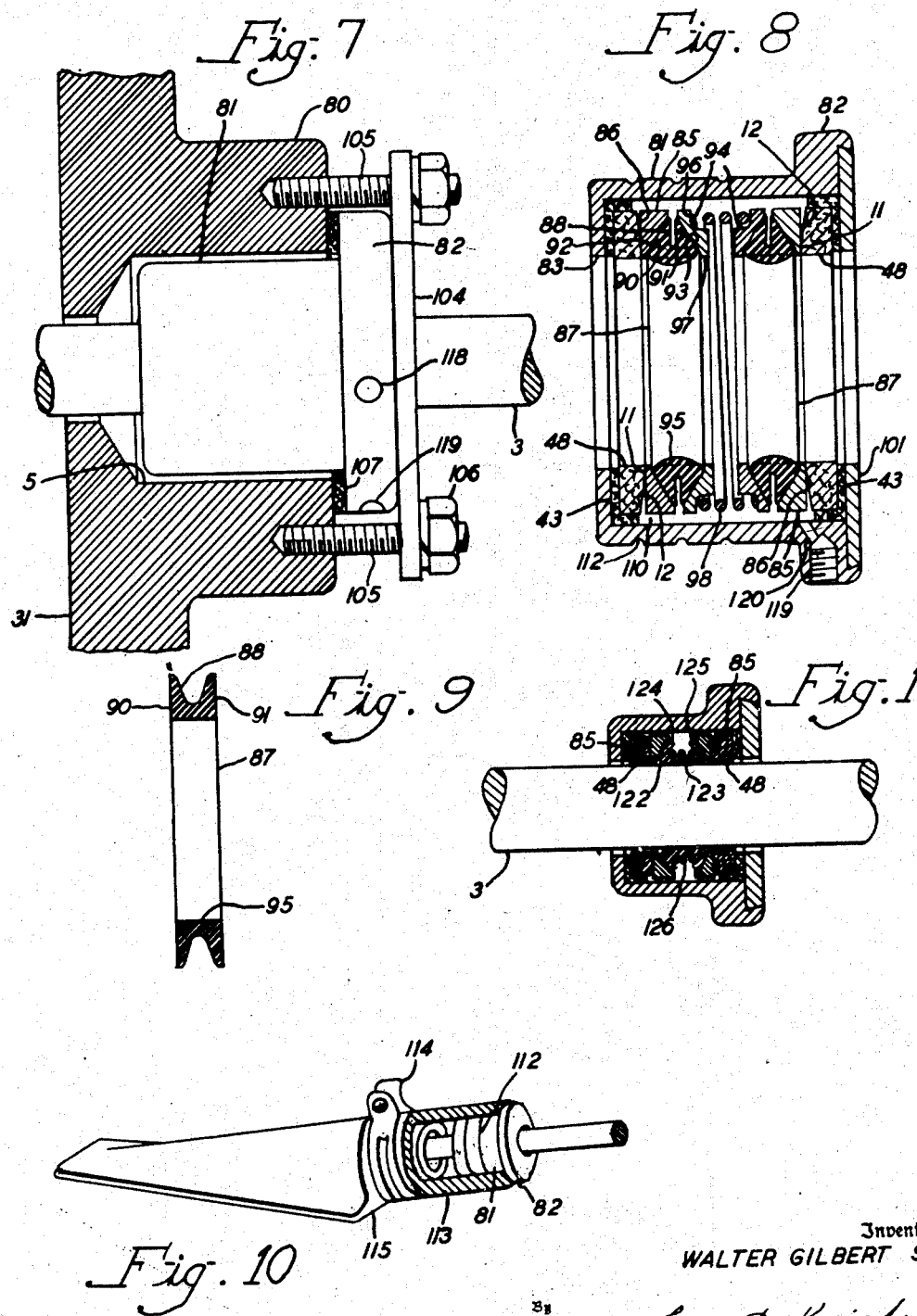

Patented June 10, 1947

2,422,007

UNITED STATES PATENT OFFICE 2,422,007

ROTARY SEAL MEMBER

Walter Gilbert, Sr., Johnstown, Pa., assignor to Syntron Company, Homer City, Pa., a corporation of Delaware Application September 4, 1943, Serial No. 501,272

7 Claims. (Cl. 286—7)

The present invention relates to apparatus for sealing relatively rotating members against leakage of gas or any other fluid therebetween, and is particularly applicable to the sealing of a rapidly rotating shaft. This application is a continuation in part of application Serial No. 427,253, filed January 19, 1942, now Patent 2,398,783, issued April 23, 1946.

It is an object of the invention to provide a seal of this character which is applicable to a variety of installations or uses.

Another object of the invention is the provision of a seal of this character having long life and great durability under severe operating conditions.

A further object is the provision of a seal which is self adjusting to take up wear, and which requires little or no servicing or lubrication after initial installation.

In accordance with the present invention I provide a seal comprising a member or ring of a solid unctuous material, such as, bonded graphite, surrounding the orifice in one part to be sealed and held in abutting sealing relation to a smooth surface by means of a solid expansible or resilient sealing sleeve, or the like, which prevents leakage at one periphery of the ring. Preferably the contacting or sealing face of the ring or of the abutting surface is formed to gradually increase the area of contact with the abutting face as the ring or abutment wears away. Preferably also, the resilient sleeve is grooved circumferentially but may have a truncated conical end engaging a similar truncated conical face of the unctuous sealing ring or backing washer therefor. I also prefer to back the resilient sleeve by a spring or the like to urge it into contact with the sealing ring.

For a more detailed description of the invention, reference is had to the following specification and accompanying drawings, wherein I have shown preferred embodiments of my invention by way of example, and wherein:

Figure 1 shows a cross sectional view on a diameter of a preferred embodiment of my invention, Figure 2 is a cross sectional view on a diameter of a preferred form of sealing ring, Figure 2a is a cross sectional view showing an assembly of certain parts in Figure 1, Figure 3 is a cross sectional view of a modification employing a rotating abutment, Figure 4 is a cross sectional view of a further modification, Figure 5 is a cross sectional view of another modification, Figure 6 is a cross sectional view of still another modification, Figure 7 is a side view of a modification with the casing to be sealed shown in section, Figure 8 is a cross section on the diameter of the modification shown in Figure 7, Figure 9 is a cross section view of a gripping sleeve, Figure 10 is a view illustrating the application of the modification of Figure 8 to a propeller shaft, and Figure 11 is a diametrical cross sectional view of a further modification.

Referring to Figure 1, there is shown a preferred embodiment of the invention applied to a centrifugal pump shaft, by way of example. The pump housing 1 has an impeller 2 rotatably mounted therein on shaft 3, which is rotatably journalled in known manner (not shown). The housing 1 has a sealing compartment 5 which may be integral with the pump housing and provides a wall 6 preferably normal to the axis of shaft 3, said wall having an aperture 7 through which the shaft extends. An area 8 surrounding the aperture is smoothly machined to provide a seat, and an annulus 9 of a solid unctuous material is rotatably maintained in contact therewith by means to be presently described.

The annulus 9 preferably is composed of graphite particles held together by a suitable binder, the composition being known in the art. It is preferably shaped to provide on one face a surface area 11 normal to its axis extending for about one third of its outer radius, the remainder 12 of the surface being disposed at an angle to the normal to provide a deviation from the normal of about five to ten thousandths of an inch at the outer diameter, depending on the diameter of the annulus. The opposite face 13 of the annulus is of frusto-conical form and is sloped at an angle of about 25° to 35° to the normal. The internal diameter of the annulus will depend on the diameter of the shaft to be sealed and is sufficiently larger to provide a clearance 14 therewith.

The annulus 9 is backed by a member or sleeve 15 of solid elastic or resilient material, such as rubber, "Ameripol," "Neoprene" or the like. "Neoprene" is the trade name of a material I believe to be polymerized chlorobutadiene, and "Ameripol" is the trade name of a material I believe to be a copolymer of acrylonitrile and butadiene. The member 15 is in the form of a sleeve, preferably substantially triangular in cross section when deformed, the faces 16 and 17 thereof forming an angle to the normal preferably less acute than the angle of face 13. The bore surface 18 of the sleeve 15 forms a close fit to the shaft 3 and the sleeve has a circumferential kerf or groove 19 extending to a depth of about two thirds the outer radius of the member.

A backing ring 21 has a sloping face 22 which preferably is radially corrugated and is sloped at about the same angle as face 13, and the rear face 23 has a central boss 24 surrounding the aperture 25 which serves as a guide for a helical spring 26. One end of spring 26 abuts the face 23 of washer 21 while the opposite end of the spring abuts the impeller 2 which has a reduced portion 27 to serve as a guide therefor.

In operation the pump shaft 3 will be rotated at a relatively high speed, as is usual in the operation of centrifugal pumps, and a suction or zone of low pressure will be created adjacent the rotor shaft which requires a seal to prevent leakage of air from the exterior. Also, when the pump is stationary it is necessary that the seal prevent leakage of fluid to the exterior of the pump. The spring 26 urges washer 21 axially of the shaft against member 15, which latter member has a close fit on the shaft and member 15 in turn is urged by the bias of spring 26 against sealing annulus 9 which in turn is urged against the finished face 8 of the wall 6. Thus, spring 26, washer 21, sleeve 15, and annulus 9 rotate in unison with shaft 3.

The unctuous character of member 9 provides a lubricated area of intimate sealing contact between rotating face 11 of member 9 and the smooth wall area 8. As the sealing member 9 is softer than the metal face 8, the face 11 will wear sufficiently to impregnate any pores in face 8 with graphite particles, thus reducing the friction between these surfaces and reducing wear to a minimum after the initial breaking in of the seal occurs. The area 11 is sufficiently narrow so as to enable the seal to be broken in relatively rapidly but is wide enough to provide a sufficient contact area to insure a seal from the beginning. As the face 11 becomes worn, which action is very slow after the initial breaking in period, more of face 12 is brought into the plane area 11 so that the area of contact increases, thus reducing the unit pressure and further reduces the wear of the sealing member 9. Because of the angular relation of face 12, the gradually increasing area of contact is broken in sufficiently rapidly to prevent excessive wear. The member 9 preferably has a porosity of not more than about 8% and a Shore schlerometer hardness of about 40 to 80.

The faces 16 and 17 of sleeve 15 preferably are not parallel with faces 13 and 22 of sealing member 9 and washer 21 respectively, the outer periphery of kerf 19 becomes compressed in initial assembly, as shown in Figure 2a, and the compression of kerf 19 tends to cause a bulge in the face 18 of the sleeve, as shown on an exaggerated scale at 30 (Figure 2a) and thus causes sleeve 15 to grip the shaft 3. The tendency of kerf 19 to assume its normal shape exerts a bias on sealing member 9 which is effective to urge member 9 against its co-operating sealing face 8, even though sleeve 15 may grip the shaft tightly enough to prevent the transmission of sufficient force from spring 26 through the sleeve for this purpose. This gripping of the shaft also assists in preventing unseating of member 9 by movement to the left. However, as the walls of the kerf relax, the grip of the sleeve 15 on the shaft relaxes and the spring is again able to exert its bias on the member 9. The exposed depth of kerf 19 and the sloping face 12 of member 9 also assists in reducing the axial thrust of pressure of the fluid in chamber 5 by reducing the resultant effective area exposed to such pressure. The clearance 14 between the periphery of member 9 and shaft 3 is sealed by the sleeve 15, it being observed that there is no relative movement between sleeve 15 and member 9, and leakage to the exterior past the outer periphery of member 9 is prevented by the sealing contact with face 8. I have found that a durometer hardness of about 55 to 60 for sleeve 15 gives satisfactory results under most conditions.

In the modification shown in Figure 3, wherein like parts are correspondingly numbered, the shaft 3 passes through a chamber 5 in housing 31 having its exterior opening closed by a perforate cover 32 bolted or otherwise suitably secured thereto and through which the shaft passes. A shoulder 33 on the shaft provides an abutment for spring 26, and the rear flat face 34 of washer 35 (which washer corresponds to washer 21) provides an abutment for the other end of the spring. Washer 35 has a forward sloping face 22.

An abutment member or washer 37 has a rear face 38 slightly out of parallel with the face 17 of sleeve 15, and its forward face comprises a section normal to the shaft axis and a sloping portion 40 which departs from the normal by a few thousandths of an inch at its outer periphery. The face 39 engages the flat face 41 of an unctuous ring 42 of graphite or similar material as previously described, the ring 42 being cemented to a gasket 43 which is in turn cemented to the cover 32 in sealing relationship. In this modification, the unctuous sealing member 42 is stationary and the co-operating metallic surface or seat member 37, sleeve 15, washer 34 and spring 26 rotate with the shaft 3, leakage between the inner periphery of member 37 and shaft 3 being prevented by sleeve 15, while leakage past the outer periphery of member 37 is prevented by the sealing engagement with ring 42. Thus, it will be seen that in this modification the unctuous ring and sealing surface are transposed.

In the modification shown in Figure 4, the seat member 45 comprises the thickened rib of a plate or diaphragm 46 clamped to the housing 31 by a plate 47 which may be bolted or otherwise suitably secured to the housing 31. The unctuous sealing member 48 has a normal portion 11 and a sloping portion 12 on one face, the portion 11 being in engagement with the seat member 45, and the opposite face 49 of member 48 is flat. The resilient sleeve 51 has a flat face 52 engaging the flat face 49 of the sealing member, the opposite sloping end 16 thereof being engaged by the face 22 of washer 34. The compression of the kerf 19 caused by flexing of only one lip thereof acts in a manner similar to the description in connection with sleeve 15. In this modification seat member 45 is stationary and the other parts of the seal rotate with the shaft 3.

In the modification shown in Figure 5, the stationary housing 55 receives a sleeve 56 with a tight sealing fit, grooves 57 being provided therein which receive oil or any other sealing material to assist in preventing leakage therethrough. The sleeve preferably is composed of cast iron which preferably contains a small percentage of copper, nickel or chromium to render it less porous. The sleeve 56 provides a clearance with the rotating shaft 3 and the outer face 58 of hub 59 thereof is smooth to provide a seat.

The smoothing of face 58 preferably is accomplished by a flat carbide steel or other suitable cutting tool on a high speed turning machine with a feed set at about .001 inch. This results in a face having a flatness of about .0002 inch to .0008 and substantially free from any waves, such as would be produced by grinding or lapping the face. Also, there is no danger of any particles of grit becoming embedded in the face and causing rapid wear.

A sleeve 60 of rubber or similar resilient material has a tapered face 17 engaging the tapered face 13 of sealing member 9 and the flat face 49 is engaged by a backing plate 61. One end of spring 26 preferably is brazed to plate 61, and the other end of the spring engages an abutment collar 62 secured to shaft 3 by a pressed fit or in any other suitable manner. In this modification the kerf 19 is omitted and the non-parallel relation of faces 13 and 17 causes sleeve 60 to grip the shaft and resist movement toward the left, tending to open the seal.

In the modification shown in Figure 6, the shaft 3 is journalled in a suitable ball bearing assembly 65 suitably secured in the casing 55, and at its inner end carries a bevel gear 67 having a hub 68 extending over a portion of the shaft. The bevel gear may rotate in a bath of oil, the seal serving to prevent escape of oil to the exterior or toward the right, as illustrated. The casing is bored at 69 to receive a sleeve 71 in fluid tight relation thereto, the end wall 72 of which provides a seating surface 73 for sealing member 9. An oil thrower 74 in the form of a flanged sleeve is secured on the hub 68 and serves as one abutment for spring 26, the spring being preferably soldered or brazed thereto. The other end of spring 26 abuts washer 61 and is soldered or brazed thereto, this washer preferably being radially serrated on the face abutting sleeve 60. The ring 74, spring 26, plate 61, sleeve 60 and sealing ring 9 thus rotate substantially as one unit, and ring 9 bears against the fixed abutment face 73.

In the modification shown in Figures 7 to 9, the seal is contained in a housing 80 of suitable material such as steel, cast iron, brass, stainless steel, synthetic resin and rubber or the like and is shown as comprising a cup shaped portion 81 having a flange 82 and an opening 83 in the bottom to receive the shaft 3. The sealing assembly is of the double type for vacuum or pressure and comprises a gasket 43 of suitable packing material such as leather, asbestos, cork, rubber, "Ameripol" or "Neoprene," cemented to the housing and a self lubricating annulus 48 of graphitic material which preferably is cemented to the packing ring 43. I prefer to use bonded microfine graphite, such as is produced by air spinning. The interior face of the ring 48 has a normal portion 11 and a conical portion 12, and an abutment seat ring 85 of suitable material has a smooth normal face or seat 86 engaging the normal portion 11 of the graphitic ring 48. A driving ring or sleeve 87 shown in undistorted shape in Fig. 9, has a groove or kerf 88 and when the ring is positioned in the sealing unit and distorted the faces 90 and 91 are engaged by the conical face 92 of abutment ring 85 and the conical face 93 of backing ring 94, while the inner cylindrical surface 95 is bulged to firmly engage the surface of the shaft 3. This bulging is shown on an exaggerated scale in Figure 8. The opposite face of follower ring 94 provides a face 96 acting as a spring seat and a boss 97 to center the spring 98.

The flanged end of the housing has an insert plate 101 held in place by screws, or by knurling over the edge of the flange, or in any other suitable manner, and a similar packing 43 may be cemented thereto. A graphitic annulus 48 may be cemented thereto with its sloping face 12 inward and having the flat portion 11 thereof engaged by an abutment ring 85. A similar sleeve 87 engages the abutment ring 85 and is backed by a follower ring 94 engaged by the spring 98.

When used as a replacement unit for a packing gland, the flange 82 is clamped against the housing 31 by a plate 104 and studs 105 and nuts 106 or the like, a gasket 107 being interposed to provide a seal, a cup portion 81 being contained within the stuffing box. Or, if desired, the flange may be secured to the housing by clips or other suitable means with the cup portion 81 extending to the exterior, that is, turned 180° from the position shown in Figure 7, as the unit is reversible.

In operation, the inner surfaces 95 of the sleeves 87 grip the shaft 3 and by the axial thrust exerted by spring 98 and the deformed sleeves, they grip the abutment rings 85 and follower rings 94, so that when the shaft rotates the unit comprising the two abutment rings 85, two sleeves 87, two backing rings 94 and spring 98 rotate with it while graphitic rings 48 remain stationary. The driving rings 87 preferably are made of a resilient material which will not take a permanent set under operating conditions, and I may use rubber, cork, cork and rubber composition, felt, asbestos, synthetic rubber or other elastic material. Leakage around the outward faces of the graphitic rings 48 is prevented by the sealing engagement of these rings with the gaskets 43, which preferably are of sufficient resiliency to provide a cushioned seat for the rings 48. Leakage around the inward faces of the graphitic rings 48 is prevented by the sealing engagement of the seat faces 86 against the portions 11 thereof, and leakage along the sloping faces 92 of the abutment rings is prevented by the engagement therewith of faces 90 of sleeves 87. Preferably the faces 11 of rings 48 are lapped against the seat faces 86 before assembly to produce a sealing contact. Leakage along the shaft is prevented by the engagement of sleeves 87 therewith, the dotted lines showing how the face 95 is compressed by engagement with the shaft. Some leakage may occur into the space 110 when the seal is first installed or before the seal is broken in, and the effect of such leakage is to trap pressure in chamber 110 which acting on the exposed faces of the sealing parts more or less neutralizes the pressure to be sealed acting on these parts. Fluid in chamber 110 cannot pass the second sleeve 87 to the exterior because of the sealing engagement of the sleeve with the shaft, nor can it escape between the sleeve and face 92 of the outer abutment ring, or between faces 86 and 11.

The clearance between the shaft 3 and the apertures through rings 43, 48, 85 and 94 is great enough to allow for slight misalignment of the shaft or for a slight wobble of the rotating rings without rubbing against the shaft and scoring the shaft and without leaking. If desired the opening 83 and the openings in members 43, 48 and 85 may be relieved on a taper to allow for greater misalignment or wobble. As the seal is a self contained unit it need not be dismantled for installation.

Referring to Figure 10, I have shown a marine propeller shaft installation in which a hose 113 is clamped at one end by a suitable hose clamp 114 to the shaft log 115, and is clamped at its other end by a similar hose clamp (not shown) to the housing 81, the propeller shaft 3 extending therethrough. For some purposes it is preferable to have grooves or corrugations 112 in the outer surface of the housing 80, as for example to assist the hose 113 to grip the surface of the cup 81. Unlike the forms previously described the bores of the rings 48 shown in Fig. 8 have a close running fit with the shaft as indicated by continuing the dotted line illustrating the face 95 of the resilient sleeve 87 that is compressed by the shaft. These rings 48 are also supported against substantial radial movement within the housing 80 by the gaskets 43. Thus in installations such as shown in Fig. 10 the weight of the seal housing and the hose 113 is carried by the shaft through the rings 48. When the seal housing is rigidly mounted as shown in Fig. 7 clearance is provided between the shaft and the bores of the rings 48 to permit the shaft to whip or vibrate without engaging these rings as shown in the other views.

If desired the shaft seal may be cooled by a cooling fluid such as water. For this purpose I provide intake and exhaust apertures 118 and 119 to which a pipe, tube or conduit may be connected, there being ducts 120 connecting with the chamber 110, and cooling fluid may be circulated therethrough by an external pump or by suitable fan blades carried with one of the rotating rings.

In the modification shown in Figure 11 the driving sleeve 122 comprises a ring of "Ameripol" or the like, similar to ring 87, having a cylindrical portion 123 and flanges 124 and 125 extending normal to the axis when in undeformed position. The spring 126 abuts against flanges 124 and 125 and thus maintains the seat rings 85 in engagement with the graphitic rings 48, and the flexing of the flanges 124 and 125 to conform to the conical faces 92 of the seat rings bulges the cylindrical portion 123 into gripping and sealing engagement of the shaft 3. In this modification one of the abutment rings 85 performs the function of a follower, in that the sleeve 122 is deformed between the two members 85.

The invention may be applied to the sealing of a valve stem or to any other apparatus having relatively rotating parts, and various modifications of the invention may be made without departing from the spirit or scope thereof.

What I claim as my invention and desire to secure by Letters Patent is:

1. In a seal the combination of a member having an opening therethrough, a second member disposed in said opening, said members being relatively rotatable, an annular chamber in one member which is substantially closed by the other member, means providing a radially disposed annular sealing surface at each end of the chamber, a pair of spaced rings in the chamber each having a complementary sealing surface arranged to engage and seal on their respective sealing surfaces at the ends of the chamber, a rubber sleeve having end faces and interposed between said rings, a radially disposed circumferential groove extending a substantial distance into the body of the sleeve which when free forms outwardly projecting flanges and opening into said chamber, a frusto-conical face on at least one ring adjacent the sleeve, and means to urge the sleeve and rings into engagement with the frusto conical surface deforming the adjacent flange without substantial axial contraction of the sleeve and forcing the end faces of the sleeve into mating sealing engagement with the rings and cause the body of the sleeve to grip and seal on the member that closes the chamber preventing relative rotary motion between the sleeve and said member, and to exert pressure on the sealing surfaces, the frusto-conical face forming an acute angle relative to the gripped member.

2. In a seal the combination of a member having an opening therethrough, a second member disposed in said opening, said members being relatively rotatable, an annular chamber in one member which is substantially closed by the other member, means providing a radially disposed annular sealing surface at each end of the chamber, a pair of spaced rings in the chamber each having a complementary sealing surface arranged to engage and seal on their respective sealing surfaces at the ends of the chamber, a pair of follower rings positioned in the chamber between the spaced rings forming two sets of adjacent rings, a rubber sleeve having end faces and interposed between the adjacent rings of a set, a radially disposed circumferential groove extending a substantial distance into the body of each sleeve which when free forms outwardly projecting flanges and opening into said chamber, a frusto-conical face on at least one ring of each set adjacent its respective sleeve, and means interposed between the follower rings to urge them in opposite directions and toward the first named rings, the frusto conical surfaces deforming the adjacent flange without substantial axial contraction of the sleeves and forcing the end faces of the sleeves into mating sealing engagement with their respective rings and cause the body of the sleeves to grip the member that closes the chamber preventing relative rotary motion between the sleeve and said member, and to exert pressure on said sealing surfaces, the frusto-conical faces forming an acute angle relative to the gripped member.

3. The structure of claim 1 characterized in that the radially disposed annular sealing surfaces at each end of the chamber are on separate rings the bores of which have a close running fit with the gripped member, and means to support each of the separate rings against substantial radial movement to support the weight of the seal parts on the gripped member.

4. In a rotary shaft seal arranged to be slid over a shaft and be mounted as a unit in a closure through which the shaft extends, the combination of, a hollow cylindrical member having an inturned annular flange providing an opening at one end, a plate having an opening aligned with the opening produced by the flange and fastened to the other end of the hollow cylindrical member to form a cylindrical chamber therein, a stationary ring mounted in sealing relation at each end of the chamber and providing opposed annular sealing surfaces, a pair of rotary rings having mating annular sealing surfaces arranged to engage the sealing surfaces of the stationary rings, sealing means interposed in mating sealing engagement with the rotary rings, said sealing means including a rubber sleeve having sealing end faces and a radially disposed circumferential groove extending a substantial distance into the body of the sleeve which when free forms outwardly projecting flanges, means to urge engagement between the sealing means and the rotary rings to exert pressure on the mating annular sealing surfaces of the rings and to force the end faces of the sleeve into mating sealing engagement, and means actuated by said last mentioned means to deform the sleeve flange and cause the body of the sleeve to bulge inwardly for the purpose of gripping and sealing on the shaft.

5. In a rotary shaft seal arranged to be slid over a shaft and be mounted as a unit in a closure through which the shaft extends, the combination of, a hollow cylindrical member having an inturned annular flange providing an opening at one end, a plate having an opening aligned with the opening produced by the flange and fastened to the other end of the hollow cylindrical member to form a cylindrical chamber therein, a stationary ring mounted in sealing relation at each end of the chamber and providing opposed annular sealing surfaces, a pair of rotary rings having mating annular sealing surfaces arranged to engage the sealing surfaces of the stationary rings, a rubber sleeve adjacent each of said rotary rings and having sealing end faces and a radially disposed circumferential groove extending a substantial distance into the body of the sleeve which when free forms outwardly projecting flanges, and means interposed between the sleeves to exert pressure through the sleeves on the mating annular sealing surfaces of the rings and to cause the flanges of the sleeves to deform bulging the body of the sleeves inwardly for the purpose of gripping and sealing at spaced intervals on the shaft.

6. In a rotary shaft seal arranged to be slid over a shaft and be mounted as a unit in a closure through which the shaft extends, the combination of, a hollow cylindrical member having an inturned annular flange providing an opening at one end, a plate having an opening aligned with the opening produced by the flange and fastened to the other end of the hollow cylindrical member to form a cylindrical chamber therein, a stationary ring mounted in sealing relation at each end of the chamber and providing opposed annular sealing surfaces, a pair of rotary rings having mating annular sealing surfaces arranged to engage the sealing surfaces of the stationary rings, a rubber sleeve adjacent each of said rotary rings and having sealing end faces and a radially disposed circumferential groove extending a substantial distance into the body of the sleeve which when free forms outwardly projecting flanges, a pair of abutment rings interposed between the sleeves, means to force the abutment rings apart and into engagement with the end faces of the adjacent sleeves to exert pressure through the sleeves on the mating annular sealing surfaces between the stationary and rotary rings, and means on the rings adjacent the sleeves to deform the sleeve flanges and cause the body of the sleeves to bulge inwardly for the purpose of gripping and sealing at spaced intervals on the shaft.

7. In a self-contained rotary shaft seal arranged to be slid over the end of a shaft extending from a housing and mounted as a unit in sealed relation with the shaft housing, the combination of a hollow cylindrical casing assembled to form a chamber having end walls with aligned clearance openings to receive the shaft, a stationary ring of unctious material resiliently mounted in sealed relation on the inner face of each end wall and provided with clearance for the shaft, a lapped seal surface on the inner face of each stationary ring, a rotary metallic ring for each stationary ring having a lapped sealing surface to mate in rotary engagement with the surface of the stationary ring, an integral rubber sleeve having a bore to receive and seal on the shaft and interposed in sealing relation between the rotary metallic rings, and means arranged to urge the rotary rings into sealing engagement with their respective stationary rings.

WALTER GILBERT, Sr.

REFERENCES CITED

The following references are of record in the file of this patent:

UNITED STATES PATENTS

| Number | Name | Date |
|---|---|---|
| 784,785 | Getts | Mar. 14, 1905 |
| 1,489,065 | Clifton | Apr. 1, 1924 |
| 1,926,006 | Kohler | Sept. 5, 1933 |
| 1,861,275 | Hopkins | May 31, 1932 |
| 2,158,297 | Newill et al. | May 16, 1939 |
| 432,327 | Page | July 15, 1890 |
| 1,862,887 | Durdin | June 14, 1932 |
| 1,931,733 | Leibing | Oct. 24, 1933 |
| 2,306,417 | Weissner | Dec. 29, 1942 |